US012665877B2

(12) United States Patent
Vandenbussche et al.

(10) Patent No.: US 12,665,877 B2
(45) Date of Patent: Jun. 23, 2026

(54) ONION ROUTING NETWORK FOR SMART HOMES

(71) Applicant: THE TRUSTEES OF DARTMOUTH COLLEGE, Hanover, NH (US)

(72) Inventors: Adam Vandenbussche, Kirkland (CA); David Kotz, Lyme, NH (US); Timothy Pierson, Hanover, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 232 days.

(21) Appl. No.: 18/196,689

(22) Filed: May 12, 2023

(65) Prior Publication Data

US 2023/0370425 A1 Nov. 16, 2023

Related U.S. Application Data

(60) Provisional application No. 63/341,366, filed on May 12, 2022.

(51) Int. Cl.
*H04L 9/40* (2022.01)
*H04L 45/745* (2022.01)
(52) U.S. Cl.
CPC ........ *H04L 63/0236* (2013.01); *H04L 45/745* (2013.01); *H04L 63/0435* (2013.01)
(58) Field of Classification Search
CPC .............. H04L 63/0236; H04L 45/745; H04L 63/0435
USPC ......................................................... 726/11
See application file for complete search history.

(56) References Cited

U.S. PATENT DOCUMENTS

| | | | | |
|---|---|---|---|---|
| 6,266,704 | B1* | 7/2001 | Reed ................... | H04L 63/0407 713/153 |
| 7,395,348 | B1* | 7/2008 | Cieslak ................ | H04L 67/568 709/238 |
| 10,911,361 | B2* | 2/2021 | Brown ................ | H04L 45/7453 |
| 11,425,093 | B2* | 8/2022 | Els ...................... | H04L 67/60 |
| 2018/0288013 | A1* | 10/2018 | Hennebert ........... | H04W 12/08 |
| 2020/0137121 | A1* | 4/2020 | Rogers ................ | H04L 63/0209 |
| 2021/0266185 | A1* | 8/2021 | Konda ................ | H04L 61/4511 |

OTHER PUBLICATIONS

Jadav "Deep Learning and Onion Routing-Based Collaborative Intelligence Framework for Smart Homes Underlying 6G Networks" Apr. 4, 2022 (Year: 2022).*
Hiller, "Tailoring Onion Routing to the Internet of Things: Security and Privacy in Untrusted Environments", Oct. 31, 2019 (Year: 2019).*
McLachlan "Scalable Onion Routing with Torsk" Nov. 13, 2009 (Year: 2009).*

(Continued)

*Primary Examiner* — Lynn D Feild
*Assistant Examiner* — Saad Ahmad Abdullah
(74) *Attorney, Agent, or Firm* — Cozen O'Connor

(57) ABSTRACT

A method of providing user data privacy for smart devices in a user's home uses a network of smart home routers to route encrypted data packets from the smart devices instead of sending them directly to a cloud-based service. An onion routing network for protecting the privacy of smart devices uses a plurality of smart home routers and an allowlist of domains accessed by smart devices to decide which data packets are routed through the network.

18 Claims, 6 Drawing Sheets

(56)　　　　　　References Cited

OTHER PUBLICATIONS

Alshehri et al. "Attacking and Protecting Tunneled Traffic of Smart Home Devices", CODASPY, Session 7, Mar. 2020, pp. 259-270.

Apthorpe et al. "Keeping the Smart Home Private with Smart(er) IoT Traffic Shaping", Mar. 16, 2019, 21 pages.

Apthorpe et al. "A Smart Home is No Castle: Privacy Vulnerabilities of Encrypted IoT Traffic", May 18, 2017, 6 pages.

Haque et al., "Anonymity Network Tor and Performance Analysis of 'ARANEA'—an IOT Based Privacy-Preserving Router", Jun. 4, 2019, 16 pages.

Bradshaw et al., "Privacy by Infrastructure: The Unresolved Case of the Domain Name System", Policy & Internet, vol. 11, No. 1, 2019, 21 pages.

Crabtree et al., "Building accountability into the Internet of Things: the IoT Databox model", Journal of Reliable Intelligent Environments, 2018, pp. 39-55.

Datta et al., "A Developer-Friendly Library for Smart Home IoT Privacy-Preserving Traffic Obfuscation", IoT SP'18, Aug. 20, 2018, pp. 43-48.

Henri et al., "Protecting against Website Fingerprinting with Multihoming", Proceedings on Privacy Enhancing Technologies, 2, 2020, pp. 89-110.

Herrmann et al., "Website Fingerprinting: Attacking Popular Privacy Enhancing Technologies with the Multinomial Naïve-Bayes Classifier", CCSW 09: Proceedings of the 2009 ACM workshop on Cloud computing security, Nov. 13, 2009, 12 pages.

Hoang et al., "A TOR-Based Anonymous Communication Approach to Secure Smart Home Appliances", ICACT Transactions on Advanced Communications Technology (TACT) vol. 3, Issue 5, Sep. 2014, pp. 517-525.

Khan et al., "An Empirical Analysis of the Commercial VPN Ecosystem", IMC, 2018, 14 pages.

Landau, "Categorizing Uses of Communications Metadata: Systematizing Knowledge and Presenting a Path for Privacy", NSPW, 2020.

Lee et al., "Tor's Usability for Censorship Circumvention", Proceedings on Privacy Enhancing Technologies, 2017, 20 pages.

Liu et al., "EPIC: A Differential Privacy Framework to Defend Smart Homes Against Internet Traffic Analysis", IEEE Internet Of Things Journal, vol. 5, No. 2, Apr. 2018.

Paracha et al., "IoTLS: Understanding TLS Usage in Consumer IoT Devices", IMC 2021, pp. 165-178.

Thomasset et al., "SERENIoT: Collaborative Network Security Policy Management and Enforcement for Smart Homes", Mar. 5, 2020, 19 pages.

Varvello et al., "VPN-Zero: A Privacy-Preserving Decentralized Virtual Private Network", FIP Networking Conference, 2021.

Xiong et al., "Network Traffic Shaping for Enhancing Privacy in IoT Systems", Ieee/Acm Transactions On Networking, 2021, 18 pages.

Yu et al., "PrivacyGuard: Enhancing Smart Home User Privacy", IPSN, 2021, pp. 62-76.

* cited by examiner

230

232
Originator node 102 receives packet from smart device.

234
Originator node checks a packet destination against an allowlist.

NO

YES

236
Identify a preformed circuit.

242
Send packet to cloud-based destination.

238
Encapsulate the plaintext IP packet in at least three layers of encryption.

240
Send the encapsulated packet to the first node in the preformed circuit.

320 Encrypted payload decryptable by R1

314 Encrypted payload decryptable by R2

308 Encrypted payload decryptable by R3

302
Plaintext IP Packet
Source: Client
Destination: Web
Server

318 Cleartext destination: R1

312 Cleartext destination: R2

306 Cleartext destination: R3

304

310

316

ONION ROUTING NETWORK FOR SMART HOMES

CROSS REFERENCE TO RELATED APPLICATION

This application claims priority to U.S. Provisional Application No. 63/341,366 filed May 12, 2022 titled "TorSH: The Onion Router for Smart Homes," the entirety of which is incorporated by reference.

GOVERNMENT RIGHTS

This invention was made with government support under grant no. 1955805 awarded by the National Science Foundation. The government has certain rights in the invention.

BACKGROUND

It is becoming increasingly popular for consumers to install Internet-connected smart devices such as doorbell cameras, thermostats, lightbulbs and appliances in their homes. This type of installation may be referred to as an Internet of Things (IoT). In consumer IoT environments, smart devices may be convenience-enhancing products: smart assistants make it easier to check the weather, enjoy music, or otherwise manage the home, smart medical devices enable patients to receive medical treatments or services from the comfort of their home, smart cameras and smart sensors provide peace-of-mind while away, etc.

Smart devices are typically connected to the Internet so that various aspects of their operation may be monitored using a mobile device or a third party. Connection to the Internet is inherently facilitated by an Internet Service Provider (ISP). Metadata such as IP addresses, time stamps, and other information arising from the communications between these devices and the ISP empowers anyone who is privy to this traffic to profile users, even when adequate encryption is used to prevent eavesdroppers from reading the specific data exchanged by devices. Knowledge of customers' incoming and outgoing traffic may be used to improve services or sell profiles to advertisers, for example.

ISPs can analyze the metadata associated with smart device traffic to infer users' interactions with their devices, even when the traffic is encrypted. With this information, ISPs can build detailed advertising profiles. Although ISPs can profile users based on their browser traffic alone, the "single-purpose IoT nature" of smart devices can significantly enrich these profiles. In fact, ISPs' powerful vantage point empowers them to include the traffic from all devices in a home, providing them a competitive advantage over edge-based advertisers like Facebook and Google.

ISPs and ISP-like entities may be considered adversaries who a) act as intermediaries providing infrastructure with access to a home's Internet traffic communications metadata e.g., ISPs, VPN providers, gateway operators, governments, and b) are interested in mass profiling of consumers. Consumers may be understood as entities who a) are interested in improving their privacy from ISP-like adversaries, but may not be willing to sacrifice their smart home experiences and b) may or may not possess advanced technical administration skills.

SUMMARY OF THE INVENTION

In a first aspect, a computer-implemented method of providing user data privacy for smart devices connected to a smart home router participating as a node in one or more circuits of an onion routing network of routers connected to a communications network.

In a second aspect, an onion routing network for protecting the privacy of smart devices includes at least three routers communicating over a network. One or more of the routers may be a smart home router.

DETAILED DESCRIPTION OF THE EMBODIMENTS

Figure 1:
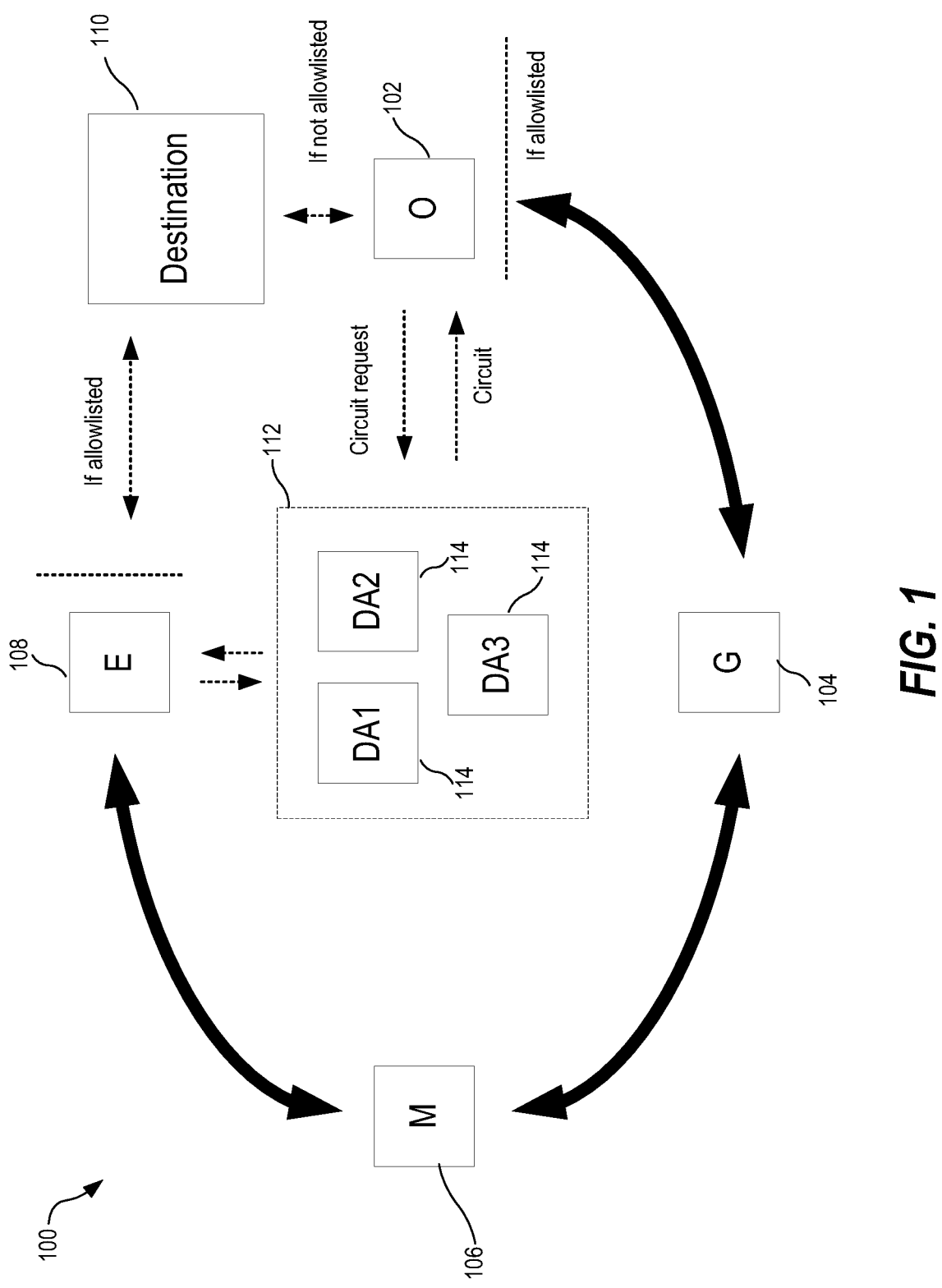
FIG. 1 is a block diagram of an onion routing network for smart homes, in embodiments.

As consumers deploy Internet-connected smart devices in their homes, residences are rapidly becoming novel troves of personal data. While users are free to choose smart devices from manufacturers that respect their privacy preferences, users nonetheless inherently divulge some related information to any intermediaries that assist in these devices' communications, including but not limited to ISPs. While most devices use encryption to safeguard their communications with their cloud-based service providers, access to mere communications metadata may still divulge significant insights into consumer behavior. As used herein, metadata includes the IP addresses of a packet's source or destination, the ports used for communication, the payload size in each packet, and the rate of communications, which may change over time.

An entity with access to the metadata arising from encrypted communications between a sleep monitor, a security camera, a smart assistant, and each of their respective cloud-based service providers could reveal detailed information about a smart home resident's sleep habits, movement through the home, and daily routines, for example.

In addition to ISPs, entities such as apartment building network managers, VPN providers, or even governments may have interest in acquiring or buying consumer metadata from a smart home. Two common characteristics shared by these entities is that a) they are essential to providing Internet connectivity and b) they are impossible to bypass by virtue of market conditions or their location in network infrastructure.

As used herein, smart devices include digital appliances, small or large, that may communicate with each other and/or servers hosted on the Internet via network interfaces. These devices may interact with the environment via sensors or actuators, may be stationary or mobile, and may or may not be equipped with a user interface for manual configuration or interaction on the user's part.

Examples of smart devices include smart speakers, smart televisions, smart video cameras, smart mattresses, smart refrigerators, etc. A smart home is an individual residential dwelling, such as a detached home, a semi-detached home, or an apartment, in which one or more smart devices are deployed. Smart homes are distinguished from not-so-smart homes, which do not contain smart devices but may contain Internet-connected devices such as personal computers or smart phones. Some of the IoT devices used in a smart home may include smart sensors such as a Govee™ Thermo-Hygrometer, smart lamps, smart assistants such as an Amazon Echo Dot™ and smart cameras such as a Blink Mini™ or a Ring™ doorbell. Other smart devices include smart speakers, televisions, mattresses, refrigerators, etc. This list is not exhaustive and other IoT devices may be incorporated without departing from the scope disclosed herein. In general, smart devices are those that can communicate with each other or their cloud-based service providers over a network.

Smart devices can communicate with each other over the local area network (LAN) or with their cloud-based service providers over the wide area network (WAN). These cloud-based service providers may be maintained by the device's manufacturer or by third parties. Communications with cloud-based service providers may be conducted using either custom protocols or existing protocols such as Hypertext Transfer Protocol (HTTP), Constrained Application Protocol (CoAP), Message Queueing Telemetry Transport (MQTT), or Extensible Messaging and Presence Protocol (XMPP), which are in turn based on either Transmission Control Protocol (TCP) or User Datagram Protocol (UDP) for packet transmission, for example.

As used herein, an endpoint in a network may be identified as a tuple of (Address, Port E [1, 65535], Protocol $\in$ {TCP, UDP}).

Human-readable domain names like www.example.com are assigned machine-readable IP addresses, such as 93.184.216.34, of servers ready to respond to requests for that domain name. IP addresses may be reassigned to various domain names over time, and there may be dozens, hundreds, or even thousands of IP addresses for a given domain name worldwide at any point in time. As such, it is best practice for software developers to encode domain names instead of IP addresses into their programs. However, this means that when devices want to communicate with a particular domain name, they first need to resolve that domain name into one of the IP addresses currently associated with it. This resolution process uses the hierarchical, distributed Domain Name System (DNS) system. DNS requests are typically unencrypted. Once resolved, the results of DNS requests are often cached and the device can communicate with its target endpoint.

Most (but not all) smart-device communications are encrypted, meaning the payload attached to each packet is decipherable by only its intended recipient. However, some metadata, such as the IP addresses of the packet's source and destination, as well as its size, is directly attached to the encrypted payload and is thus transmitted in unencrypted packet headers, while further metadata, such as the time and rate of successive communications, can be easily recorded by an observer.

Typically, smart devices communicate more frequently with a target endpoint while in active use (e.g., as a user is actively speaking to a smart assistant, or a user is standing on a smart scale). In fact, these communications may be necessary to ensure proper device functioning; blocking them could inhibit device functionality.

Endpoints may be either within the home's cyberperimeter, such as other smart devices within the home, or outside of it, such as cloud-based service providers. All smart homes must be equipped with at least one router, which facilitates communications between devices and services. When a smart device communicates with another device within the same smart home, the router redirects packets to the proper device per the destination's LAN IP address. However, to communicate with external endpoints, smart devices require additional infrastructure, such as gateways (e.g., operated by an apartment building), ISPs, and DNS resolvers, all of which are privy to the communications leaving the home's cyberperimeter. When sending packets to the WAN, routers typically replace the originating device's private LAN IP address with the home's public IP address as part of a process known as Network Address Translation (NAT); the destination IP of any inbound response packets is then restored from that of the home to that of the original device.

When an entity is privy to network traffic, even when encrypted, the entity can analyze the metadata associated with that traffic to infer characteristics of or interactions with the originating devices. Such attacks are known as traffic analysis attacks, or website fingerprinting attacks when their goal is to profile users based on their web browsing habits. Note that traffic analysis can also be performed to benevolent ends, such as to identify and isolate compromised devices or to help network administrators identify which devices are connected to their networks.

Traffic analysis can be performed on both wireless and wired communications, albeit with different considerations. Analyzing wireless communications requires the adversary to be within radio range of the victim, but analysis is not limited to only Internet traffic; Bluetooth and Zigbee packets, for example, could also be analyzed. In the wired medium, the adversary lacks access to certain metadata only found in the wireless medium (e.g., signal strength), but the adversary no longer needs to be in physical proximity to the victim. Instead, they can observe traffic at any point in the wired network, although different points in the wired network will provide different insight. Namely, adversaries with access to only traffic outside the home's cyberperimeter cannot observe inter-device communications within the cyberperimeter.

Onion routing is a technique that empowers users to access the Internet anonymously by routing traffic through a network of volunteer-run servers before sending packets to their intended destination. Messages transmitted over the network are encapsulated in layers of encryption, then transmitted between a series of network nodes, referred to as onion routers, because each node decrypts a single layer of encryption, then send the rest of the message on to the next node. The largest and best-known implementation of onion routing, then called The Onion Router (Tor) Project™.

Onion routing may also be referred to as a distributed routing network. Under onion routing, packets are routed through multiple (for example, three) intermediary servers, collectively forming a circuit, before being sent to their intended destination. Each packet is encrypted under multiple layers of encryption—like layers of an onion—with each only decryptable by the predetermined intermediary. As a result, each intermediary is privy to some metadata pertaining to the user's web access, but not enough to piece together their entire interaction. Namely, intermediaries are known as guard nodes (also known as entry nodes), middle nodes, and exit nodes.

Smart home onion routing uses a collaborative network of smart home routers working to prevent user profiling via IoT traffic analysis by an ISP-like entity.

Routing all of a home's network traffic into existing privacy-enhancing traffic technologies, such as a Virtual Private Network (VPN) or onion routing (Tor), could result in a level of latency where increased privacy may not be worth hindered experience. While some experiences are latency sensitive, like loading web pages, others may be less so, like smart devices uploading data to the cloud. In embodiments, smart home onion routing selectively routes transmission control protocol (TCP) and user datagram protocol (UDP) packets related to IoT devices and services into a privacy-enhancing network while leaving non-IoT traffic unencumbered.

Figure 4:
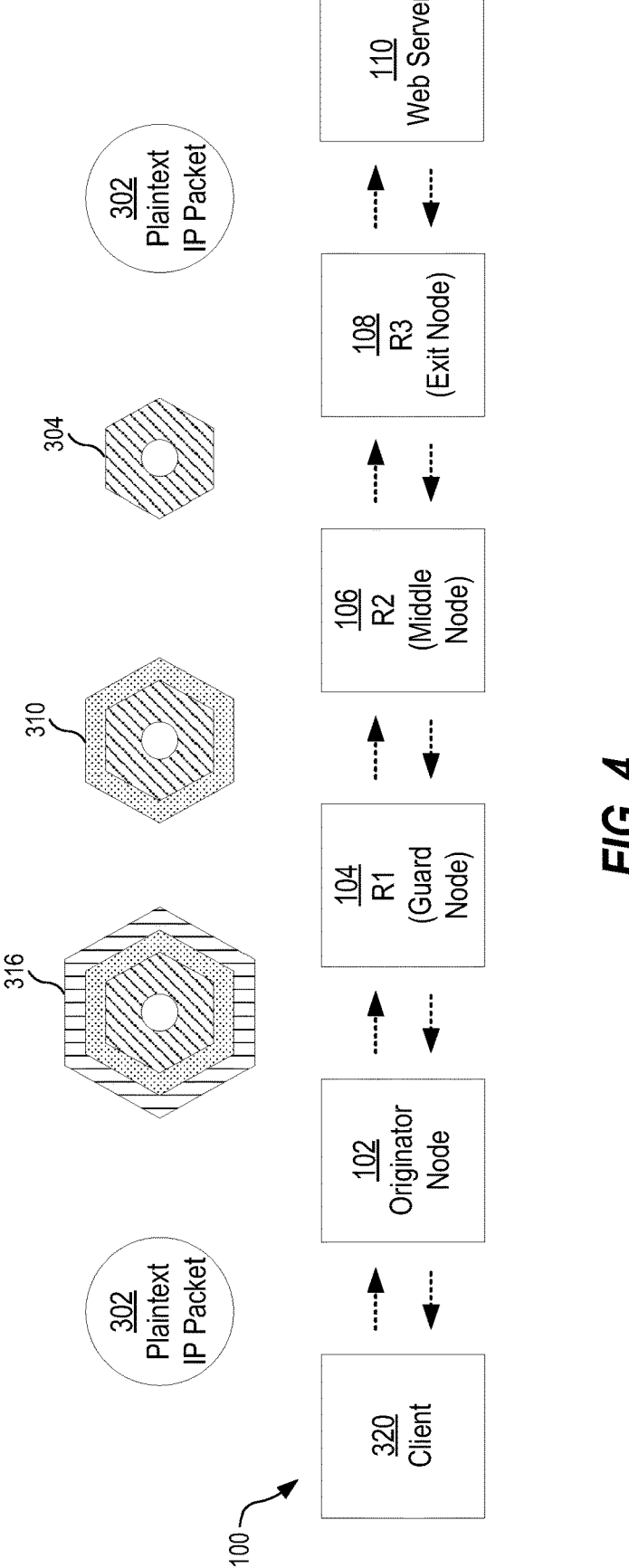
FIG. 4 is a flowchart showing the transfer of the packets of FIG. 3 through an onion routing network, in embodiments.

FIG. 1 illustrates an onion routing network 100 for a smart home. Under onion routing, packets are routed through three or more intermediary servers, collectively forming a circuit, before being sent to their intended destination. Packets are encrypted under one layer of encryption per intermediary server, each only decryptable by the predetermined intermediary. As a result, no intermediary is privy to enough metadata to piece together the entirety of the originator's traffic—as the first intermediary only knows a packet's source, not its final destination, the final intermediary only knows its final destination, not its source, and other intermediaries know neither, and therefore, ISPs have difficulty profiling the traffic. In embodiments, the onion routing application Tor may be used to handle packet routing for onion routing network 100 but any routing application using layers of encryption and a plurality of nodes may be used. In FIG. 4, client 322 communicates bidirectionally with destination 110 via router, or originator node 102, and relays R1 104, R2 106, and R3 108, thus requiring three layers of encryption per direction of communication.

In FIG. 1, originator node 102 is a router that communicates with smart devices in a user's home. It may be, for example, a smart home router including onion routing software. Originator node 102 generates a data packet encapsulated in one or more (commonly three) layers of encryption for delivery to an end point over the Internet in response to a communication from a smart device, and sends any packets received from the end point back to the smart device. In embodiments, an onion routing circuit includes guard node 104, middle node 106 and exit node 108. Destination 110 represents all servers reachable over the internet that may serve as destination endpoints for smart devices, as well as Internet and cloud-based traffic in general.

Figure 3:
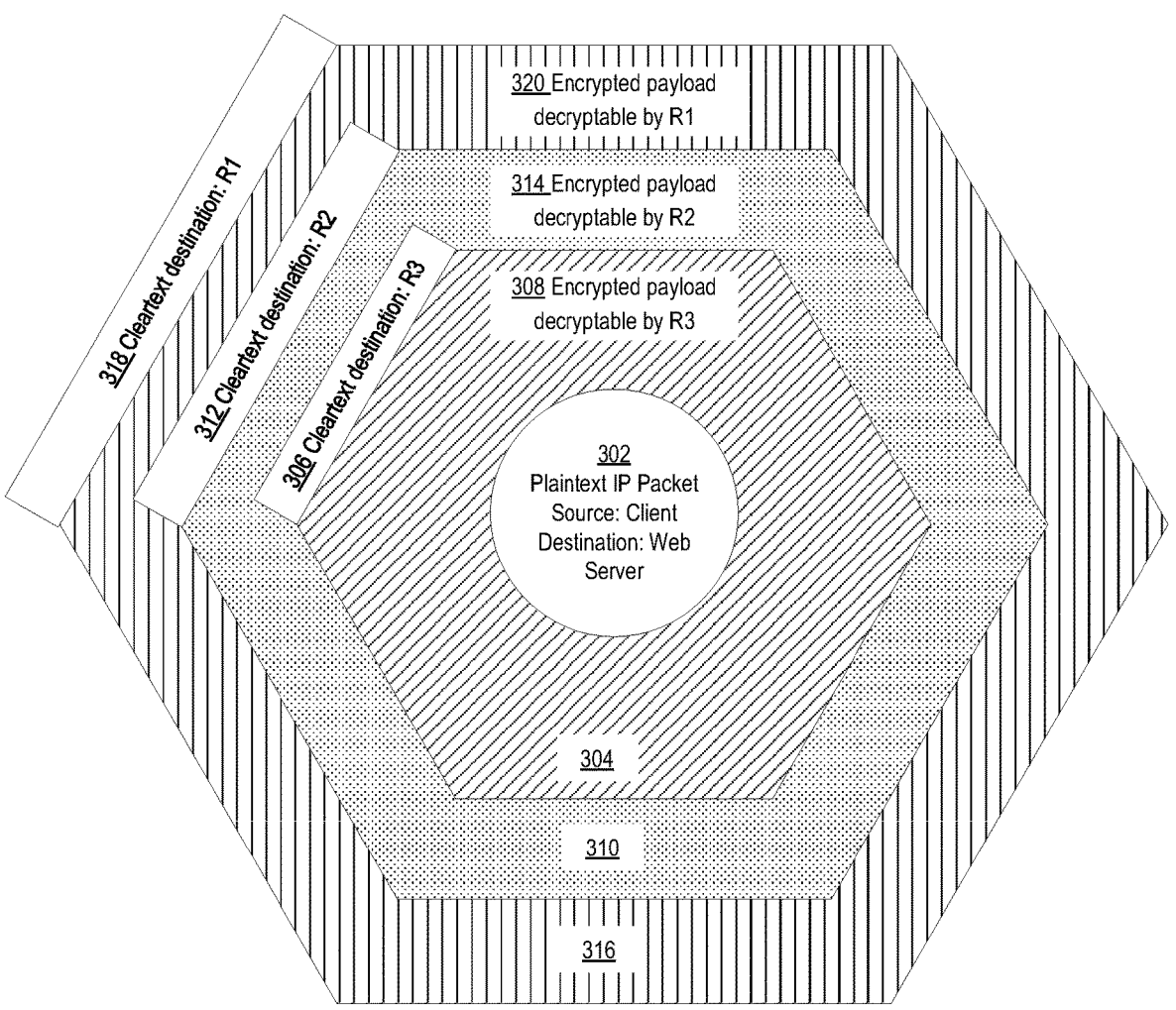
FIG. 3 is a representations of encapsulated and encrypted packets sent through the onion routing network of FIG. 1, in embodiments.

FIG. 3 is a representation of an encapsulated and encrypted data packet sent by originator node 102 in onion routing network 100. FIG. 4 is a flow chart illustrating the transfer and decryption of packets through onion routing network 100. Although a circuit with three nodes, or routers, is shown, any number of routers may be used in onion routing network 100. In FIG. 3, a plaintext IP packet 302 from a client 322, or smart device, is sent to originator node 102, where it is encapsulated in three layers of encryption:
1. First layer packet 304 includes a cleartext destination address 306 for node R3 (exit node 108) and an encrypted payload 308 decryptable by only node R3, the encrypted payload 308 encapsulating plaintext IP packet 302.
2. Second layer packet 310 includes a cleartext destination address 312 for node R2 (middle node 106) and an encrypted payload 314 decryptable by only node R2, the encrypted payload encapsulating first layer packet 304 and plaintext IP packet 302.
3. Third layer packet 316 includes a cleartext destination address 318 for node R1 (guard node 104) and an encrypted payload 320 decryptable by only node R1, the encrypted payload encapsulating second layer packet 310, first layer packet 304 and plaintext IP packet 302.

FIG. 4 is a flowchart illustrating the routing of plaintext IP packet 302 through onion routing network 100. Client 322 sends plaintext IP packet 302 to originator node 102 where encapsulated and encrypted packet 316 is generated. Originator node 102 sends packet 316 to node R1, or guard node 104, using cleartext destination address 318.

Guard node 104 knows the originator's identity (i.e., its IP address) but does not know the intended destination endpoint. Upon decrypting third layer packet 316, guard node 104 reveals cleartext destination address 312 for node R2, removes a layer of encryption, and forwards second layer packet 310 to node R2, middle node 106.

Middle node 106 receives second layer packet 310 from guard node 104. Middle node 106 knows neither the identity of originator node 102 nor the intended destination endpoint. Upon decrypting second layer packet 310, middle node 106 reveals cleartext destination address 306 for node R3, removes a layer of encryption, and forwards first layer packet 304 to node R3, exit node 108. In embodiments there may be multiple middle nodes.

Exit node 108 is the last node of the onion routing network 100. Exit node 108 receives first layer packet 304 from middle node 106, and upon decrypting the final layer of the packet, determines the intended destination endpoint of plaintext IP packet 302. The identity of originator node 102, however, is unknown to exit node 108. Exit node 108 assumes responsibility for the packets it routes to destination 110 over an ISP. From an ISP's point of view, it looks like exit node 108 is the originator of the traffic it routes, not the originator node 102 that originally received plaintext IP packet 302 from client 322.

In embodiments, the circuit formed by node R1 (guard node 104), node R2 (middle node 106) and node R3 (exit node 108) is also used in reverse, to send data packets from destination 110 to client 322. In reverse, each node re-encrypts the packet it received from the previous node then re-encapsulates it in a header containing the cleartext destination of the next node.

Referring again to FIG. 1, circuits formed of guard, middle and exit nodes are built with the help of directory authority (DA) 112. DA 112 is a collection of one or more special servers that advertise intermediary nodes that are open to participating in an onion routing network. As shown in FIG. 1, DA 112 includes three servers 114 (DA1, DA2 and DA3), but any number of servers may be used. Servers 114 are not limited to a geographic location and may store duplicate content. Servers 114 maintain an allowlist of the domain names that are known to be contacted by consumer smart devices. Each node in the network references the same allowlist depending on its role in a circuit, as discussed in more detail below. The allowlist serves two purposes: (1) to tell help originator node 102 decide which packets to route into the onion routing network 100 and which to route directly to their intended destination using destination 110, and (2) to help exit node 108 ensure that the traffic they are routing is ethical and related to smart homes, as opposed to unethical or malicious traffic that could get them in trouble with their ISP.

The allowlist is collaboratively maintained by central authorities through DA 112, which may push periodic updates to the circuit nodes periodically with an update interval of $t_u$. These updates are transmitted to nodes participating in an onion routing circuit over HTTPS as an allowlist database. An allowlist database may be encoded in a data-exchange format such as JavaScript™ Object Notation (JSON), although any convenient format may be used.

Each domain name in an allowlist database also contains an effective date. To avoid some participants receiving new endpoints via allowlist updates before others due to misaligned update intervals, the effective date of each new endpoint in an allowlist database is set to the time of the central authorities' decision to amend the allowlist plus at least one update interval $t_u$. Note that endpoints that fail to receive a new allowlist database within the interval $t_u$ are offline and therefore unable to participate in traffic routing altogether; they will receive the latest allowlist once they return online.

A circuit as illustrated in FIG. 1 is temporary—a client, or originator, will use the same circuit for a maximum of 10 minutes (as a recommended lifetime, clients are free to change this value in their configuration) after which point they will build a new circuit with different nodes. This prevents the need to build a circuit for each network request while maintaining a high level of anonymity. Originator node 102 is a smart home router that handles Internet connectivity for the smart devices in the home. Guard node 104, middle node 106 and exit node 108 may also be smart home routers, but the terms guard node, middle node and exit node may apply to any type of router participating in onion routing network 100 and do not necessarily have to be a smart home router. Further, the router serving as middle node 106 for originator node 102, may also be an originator node for smart devices in a home and may form its own circuit of guard, middle and exit nodes. Onion routing network 100 may include any number of routers, each of which may be participating in any number of circuits as any type of node. In any circuit, only the smart home routers serving as originator node 102 and exit node 108 reference the allowlist, but all smart home routers in onion routing network are connected to DA 112.

Even if all data-containing packets were routed into onion routing network 100, smart device activity could be inferred through DNS requests, as smart devices are more likely to make DNS requests while actively in use. In embodiments, clients and originator nodes can redirect their DNS requests into onion routing network 100 and have them resolved by exit node 108. In the spirit of minimizing possible delay in non-smart device user experiences, DNS requests may only be routed into onion routing network 100 if the domain name being resolved is listed in the local allowlist, in embodiments.

Maintaining an up-to-date list of the domain names contacted by all commercially available smart devices is challenging. As these devices receive firmware updates and as new devices come to market, the allowlist would require frequent updates.

In embodiments, an opt-in feature allows users to consent to having the list of domain names contacted by some of their smart devices anonymously shared with the central authorities. Smart devices typically contact fewer endpoints than general devices like smartphones or personal computers. Users of onion routing network 100 may specify the maximum "complexity" of the device whose domain names they are willing to share with the central authority, where the number of domain names contacted is used as a proxy for complexity. While this data could reveal the presence of a device in the home via inference from the domain names proposed, it could not reveal usage patterns because timing data is not included. Some users may not mind sharing this data, provided only data from smart devices like smart refrigerators, smart switches, and smart cameras, for example, are shared, and not from personal computers or web browsers. If many users independently begin reporting a new domain name for a particular device, say following a software update, the central authorities could quickly add that endpoint to the allowlist after manual review.

In embodiments, this feature may be implemented by keeping track of the set of domain names contacted by each device on a router's network in a local hash map, with the hardware address of the device used as the key to the map. As soon as a device contacts more that the user's specified number of maximum domain names, profiling for that device ceases and its domain names are no longer shared with the central authorities during periodic updates. When participants share their profiled domain names with the central authorities, the domain names are grouped by originating device, but no identifying information alluding to the nature of that device is included.

In addition to using allowlists and selective DNS packet routing to route domain name requests, kernel-level routing of TCP and UDP packets requires rules based on the endpoints being contacted. Kernel-level routing for endpoints considers combinations of IP addresses, port numbers, and protocols; the domain name associated with a packet is not among its associated metadata. Determining all of the IP addresses associated with a particular domain name is difficult under the recursive DNS resolving system: these IP addresses change regularly and no central authority maintains a list of all the IP addresses associated with a particular domain name worldwide at a given point in time.

Figure 2A:
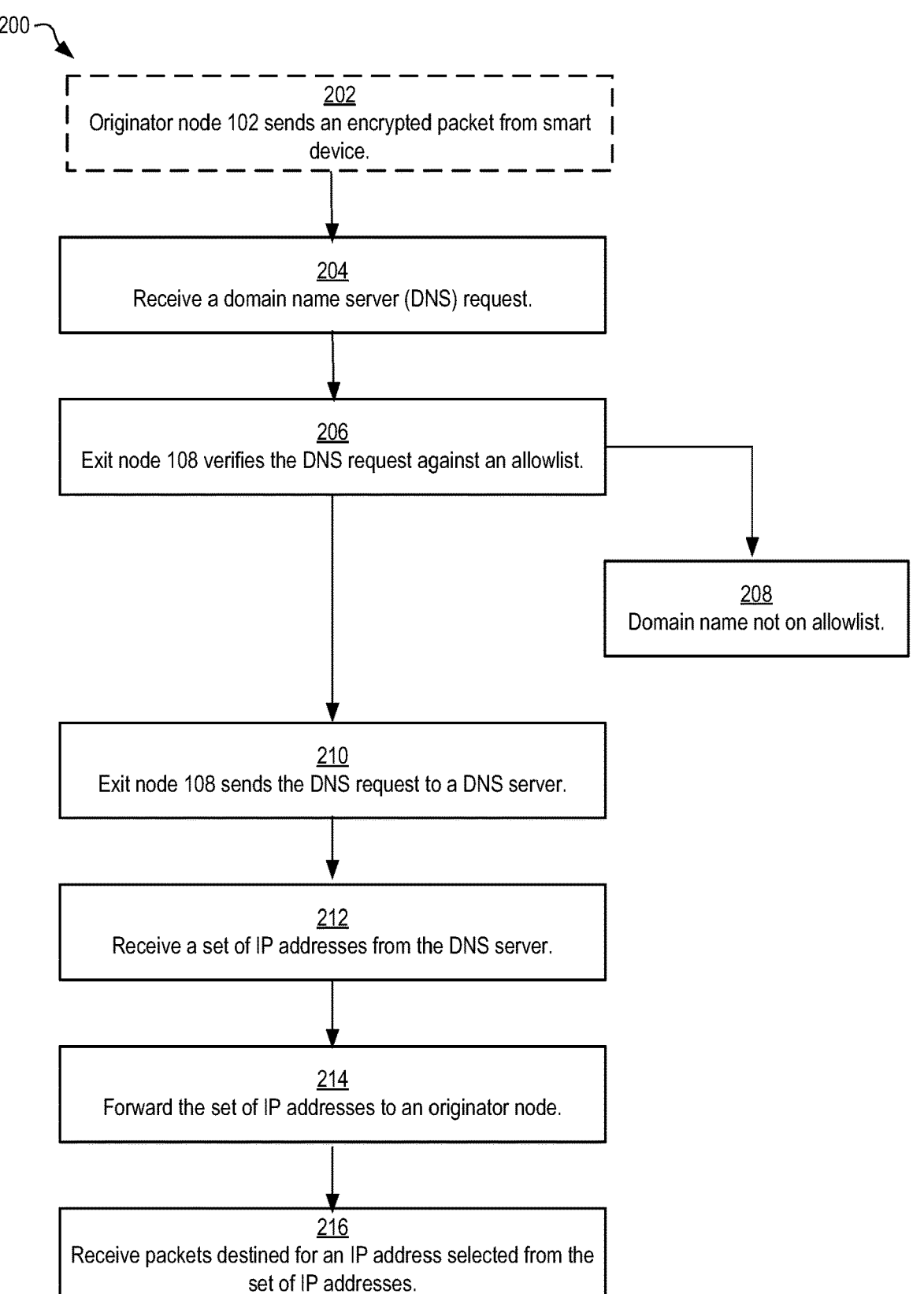
FIG. 2A is a flowchart of a method performed by an exit node in the onion routing network of FIG. 1.

FIG. 2A is a flowchart illustrating a method 200 of providing user data privacy of smart devices by an exit node in an onion routing network of smart home routers. In embodiments, onion routing network 100 decentralizes the domain name to IP address association process. By assuming that the exit router of a circuit used to resolve an originator router's DNS request is the same as that used to open the TCP connection with the associated IP address, the method of FIG. 2A may be used. In embodiments, method 200 includes steps 204-216. In some embodiments, method 200 also includes step 202.

In step 202, originator node 102 sends a packet containing a DNS request from a smart device to onion routing network 100. The DNS request contains a domain name of a server that manages that smart device. Originator node 102 routes the DNS request through the circuit if the domain name it contains is found in the universal allowlist, and routes it directly to the configured DNS resolver server otherwise.

The DNS request is passed through the circuit via the intermediary guard node 104 and middle nodes 106, neither of which can (due to the encryption of the packet's final destination) nor need to (due to the trustworthiness of routing the packet to the subsequent node in the circuit) verify whether the packet is destined for an allowlisted destination.

In step 204, a DNS request is received by exit node 108. In an example of step 204, originator node 102 places a DNS request for a domain name that is included in the allowlist. The request is therefore routed into onion routing network 100 to be resolved by exit node 108.

In step 206, exit node 108 verifies the DNS request against an allowlist of participating smart device domains. In an example of step 206, exit node 108 checks to see if the DNS request is for a domain name that is included in the allowlist. It is therefore to be trusted and exit node 108 places the request to its DNS server using destination 110 in step 210. If exit node 108 does not recognize the domain name from the allowlist, the method proceeds to step 208, exit node 108 ignores the DNS request and originator node 102 times out.

In step 212, exit node 108 receives the response from its DNS server, which returns some set of IP addresses IP={$ip_0$, $ip_1$, ..., $ip_n$} known to be associated with that domain name. The exit node saves these IP addresses in a local cache. The DNS response is then forwarded back to the originator router via onion routing network 100.

In step 214, exit node 108 forwards the set of IP addresses to originator node 102. In an example of step 212, originator node 102 receives the DNS response, also saves the set of returned IP addresses to a local cache, and randomly selects some $ip_k$, $0 \leq k \leq n$ with which to open the TCP connection. It henceforth will route packets destined for $ip_k$ into onion routing network 100.

In step 216, exit node 108 receives a packet destined for $ip_k$. It notes that $ip_k \in IP$ and therefore concludes that the traffic is destined for an allowlisted cloud-based service provider. It accepts to request to open the connection on behalf of originator node 102. If exit node 108 receives a packet destined for some $ip_j : ip_j \notin IP$, it can refuse to place the traffic on behalf of the originator node.

Thus, the issue of domain name—IP address consensus is solved. This solution is also extensible to an exit node opening connections on behalf of several originator routers simultaneously.

The assumption that an exit node for a TCP connection be the same as that which resolved the associated DNS request is practical: Tor allows specifying one or more exit routers from within its configuration files, and by periodically rotating between onion routing network 100 participants as a given router's exit node, anonymity can still be preserved. In embodiments, DNS requests from smart devices are unencrypted.

In embodiments, to ensure that local RAM in any of the nodes of onion routing network 100 is not exhausted by an ever-growing IP address cache, each locally cached IP address is assigned a time-to-live (TTL) that is longer than the typical gap between smart devices' DNS requests for the same domain name (e.g., 24 hours). When an IP address expires, it is erased from memory, but a fresh DNS response for an allowlisted domain name could reset its TTL. In the event that two domain names point to the same IP address, exit routers count the number of references to each IP address by domain names; the IP will only be deleted upon TTL expiry if no other originator nodes are still counting on it.

Figure 2B:
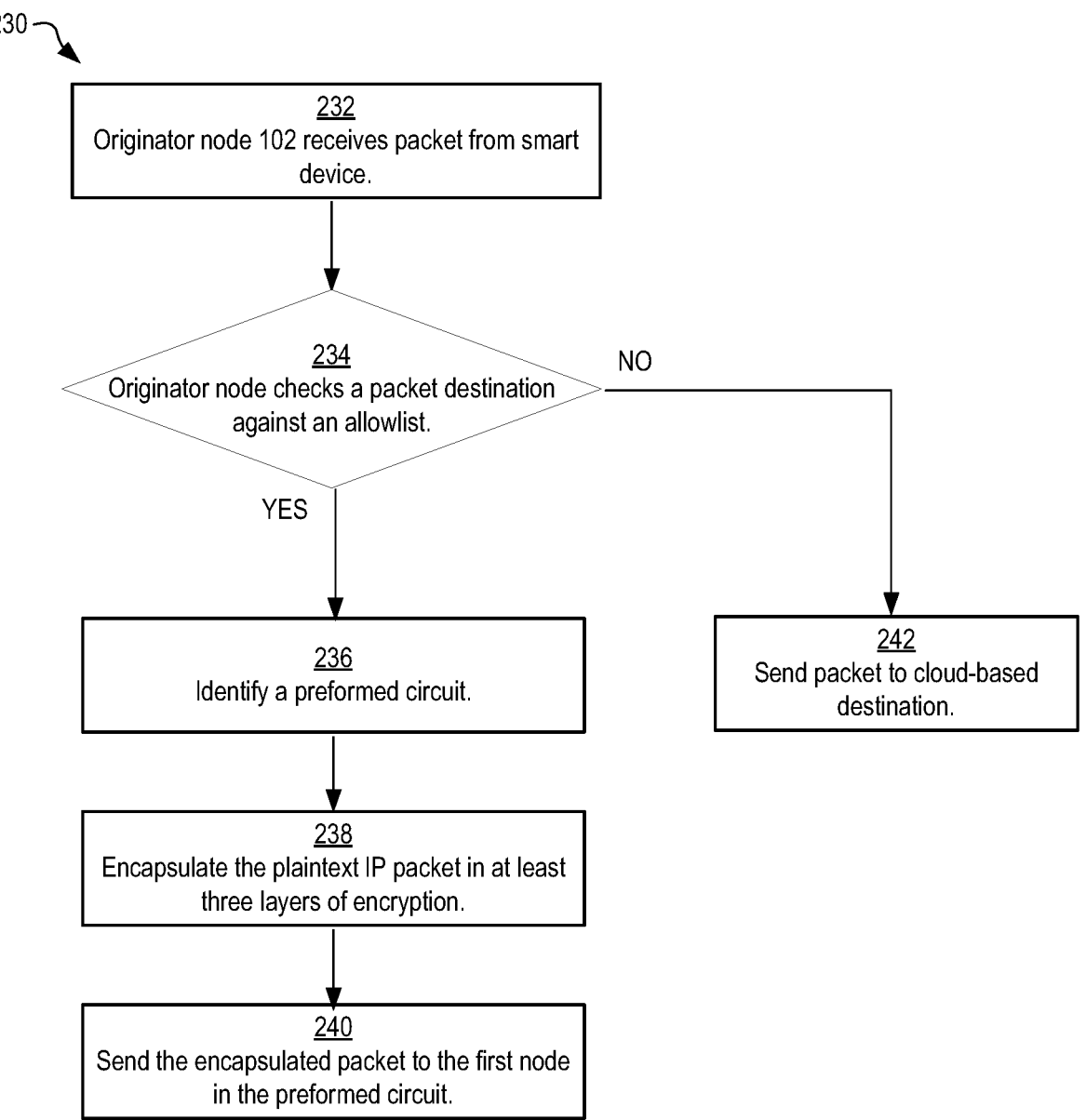
FIG. 2B is a flowchart of a method performed by an originator node in the onion routing network of FIG. 1.

FIG. 2B is a flowchart illustrating a method 230 of providing user data privacy of smart devices by an originator node in an onion routing network of smart home routers.

In step 232, originator node 102 receives a plaintext IP packet including a packet destination from a smart device. In an example of step 232, the plaintext IP packet may be a DNS request containing a domain name of a server that manages that smart device. In a further example of step 232, the plaintext IP packet may be a non-DNS packet such as a Transmission Control Protocol (TCP) packet or a User Datagram Protocol (UDP) packet and the packet destination is a destination IP address.

In step 234, originator node 102 checks the packet destination against an allowlist of cloud-based destinations. In an example of step 234, when the packet is a DNS packet containing a domain name, originator node 102 checks the domain name against an allowlist of cloud-based domains. In a further example of step 234, when the packet is a non-DNS packet and the packet destination is a destination IP address, originator node 102 checks the destination IP address against a locally cached set of IP addresses known to be associated with allowlisted cloud-based destinations.

In step 236, if the packet destination is in the allowlist, originator node 102 identifies a preformed circuit. In an example of step 236, a preformed circuit includes at least a guard, a middle, and an exit nodes in onion routing network 100. Originator node 102 may communicate with other nodes in the onion routing network 100 as a background task to identify nodes and exchange encryption keys.

In step 238, originator node 102 encapsulates the plaintext IP packet in at least three layers of encryption. In an example of step 238, originator node 102 encapsulates the plaintext IP packet in at least a first, a second and a third layer of encryption, each layer including a first, second, or third cleartext destination of the guard, middle, or exit smart home router, and a first, second or third encrypted payload, respectively.

In step 240, originator node 102 sends the encapsulated packet to the guard node at the first cleartext destination.

In step 242, if the packet destination is not in the allowlist, originator node 102 sends the plaintext IP packet to the cloud-based destination.

In embodiments, onion routing network 100 accomplishes packet routing using the iptables and ipset Linux utilities, which allows the disclosed process to install carefully crafted rules to route incoming packets into onion routing network 100 if they are destined for IP addresses related to allowlisted domain names and to block outgoing packets from exit routers if they are not. These IP addresses are encoded into a hash table (or similar data structure) of endpoints stored by the ipset extension for iptables, which allows rapid lookup times.

The Tor software is restricted to processing TCP packets (other than for DNS resolution, which is a UDP-based protocol). However, some smart devices require may send data over UDP to their cloud-based service providers (e.g., a video live stream). To support such services, UDP packets may be encapsulated in TCP before routing them through onion routing network 100. Because (1) TCP is a connection-based protocol whereas UDP is connectionless and (2) the Tor application routes TCP stream data and not entire TCP packets, such encapsulation entails having originator routers open a new TCP connection with a special IP address that is known to be recognized by exit routers as the UDP-over-TCP address. Upon receiving TCP packets destined for this address, exit node 108 will not actually route them but rather decapsulate them and send the UDP packet to its intended endpoint. This system is admittedly quite inefficient, as a TCP connection must be opened, including a full handshake, before the packet can be sent. This step may not be required if future instantiations of Tor (or other onion routing services) allow UDP communications.

In embodiments, software to manage onion routing network 100 may be deployed as an extension installed on consumers' smart home routers. The extension handles the selective packet routing logic and connects routers together in a private, Tor-like network. Onion routing network 100 users also offer their router for use as a node in onion routing network 100 in return for their use of the same network. To protect users from routing malicious or irrelevant traffic into onion routing network 100, the allowlist also serves as a defense: nodes are not expected to route traffic on behalf of another node if it is not in the allowlist (i.e., IoT-related). In addition to increased privacy from onion routing, onion routing network 100 differs from the Tor network in its support for UDP-over-TCP to ensure compatibility with devices that are dependent on UDP traffic.

Figure 5:
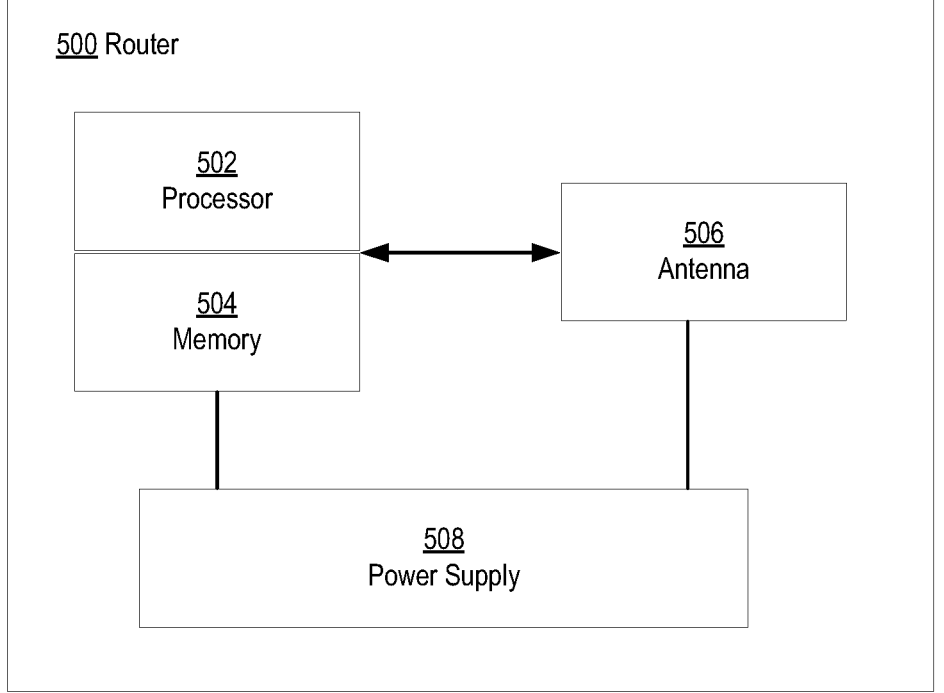
FIG. 5 is a diagram of a representative router that may be used in the onion routing network of FIG. 1.

FIG. 5 is a diagram of a representative router 500 that may be used in onion routing network 100. Processor 502 executes instructions stored in non-transitory memory 504 to accomplish any of the functions disclosed herein. Antenna 506 sends and receives information from smart home devices, other routers, and wired or wireless communication networks. Power supply 508 provides power to processor 502, memory 504 and antenna 506. Other components may be included in router 500 as needed for a particular application.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A computer-implemented method of providing user data privacy for smart devices connected to a smart home router participating as a node in one or more circuits of an onion routing network of routers connected to a network, the method comprising:
   receiving a plaintext Internet Protocol (IP) packet from a smart device at an originator node smart home router; and
   checking a packet destination which comprises a domain name or a destination IP address against a locally stored allowlist of cloud-based destinations associated with smart devices to verify that the packet destination is included in the allowlist, wherein the allowlist comprises domain names or IP addresses received from a central authority and periodically updated; and
   when the packet destination is included in the allowlist:
      identifying a preformed circuit of at least a guard, a middle, and an exit node in the onion routing network;
      encapsulating the plaintext IP packet in at least a first, a second and a third layer of encryption, each layer including a first, second, or third cleartext destination of the guard, middle, or exit smart home router, and a first, second or third encrypted payload, respectively; and
      sending the encapsulated packet to the guard node at the first cleartext destination; and
   wherein the exit node in the onion routing circuit verifies that a destination IP address of a non-DNS packet matches an IP address previously returned by that exit node in response to resolving an allowlist domain name, and refuses to forward the packet if the destination IP address does not match;
   when the packet destination is not included in the allowlist:
      sending the plaintext IP packet to the cloud-based destination.

2. The method of claim 1, wherein when the plaintext IP packet contains a domain name server (DNS) request payload containing a domain name,
   checking the packet destination further comprises:
   checking the domain name against a allowlist of cloud-based domains to verify that the domain name is included in the allowlist.

3. The method of claim 2, wherein the allowlist is maintained by one or more central authorities.

4. The method of claim 3, wherein a smart device user may consent to having a list of domain names contacted by some of the smart devices in a home of the smart device user anonymously shared with the one or more central authorities.

5. The method of claim 1, wherein when the IP packet is a non-DNS payload and the packet destination is a destination IP address, checking the packet destination further comprises:
   checking the destination IP address against a locally cached set of IP addresses known to be associated with allowlisted domain names.

6. The method of claim 1, further comprising the smart home router serving as a guard node by:
   receiving the encapsulated packet;
   decrypting the first layer of encryption to determine the second cleartext destination and the second encrypted payload; and
   sending the second encrypted payload to the second cleartext destination.

7. The method of claim 6, further comprising the smart home router serving as a middle node by:
   receiving second encrypted payload;
   decrypting the second encrypted payload to determine the third cleartext destination and the third encrypted payload; and
   sending the third encrypted payload to the third cleartext destination.

8. The method of claim 7, further comprising the smart home router serving as an exit node by:
   receiving the third encrypted payload;
   decrypting the third encrypted payload to reveal the plaintext IP packet;
   checking the packet destination against the allowlist of smart device domains; and
   when the packet destination is in the allowlist, sending the plaintext IP packet to the packet destination;
   when the packet destination is not in the allowlist, ignoring the plaintext IP packet.

9. The method of claim 8, wherein the plaintext IP packet is a domain name server (DNS) request payload containing a domain name, and the method further comprises:
   checking the domain name against an allowlist of cloud-based destinations to verify that the domain name is included in the allowlist;
      when the domain name is included in the allowlist:
         placing a DNS request for the domain name to a DNS server;
         receiving and saving a set of IP addresses associated with the domain name from the DNS server;
         encapsulating the set of IP addresses as plaintext IP packet in at least the third, second and first layers of encryption, each layer including the third, second or first cleartext destination of the third, second or first smart home router; and
         forwarding the encapsulated set of IP addresses to the third cleartext destination; and
      when the domain name is not included in the allowlist, ignoring the DNS request.

10. The method of claim 1, wherein the plaintext IP packet is a DNS request containing a domain name that was resolved by an exit router, and the method further comprises:
   receiving a set of IP addresses associated with the domain name;
   temporarily storing the set of IP addresses in a local IP cache;

when the IP address already appears in the local IP cache:

when the domain name in the DNS request is the same as the domain name that is associated with the locally cached IP address:

resetting a time-to-live (TTL) of the IP address;

when the domain name in the DNS request is different than the domain name that is associated with the locally cached IP address:

adding that domain name to a list of domain names associated with that locally cached IP address;

when the IP address does not already appear in the local IP cache:

adding the IP address to the local cache with a configured TTL;

adding that domain name to the list of domain names associated with that locally cached IP address.

11. The method of claim 1, further comprising the router periodically removing IP addresses from its local cache when their TTL has expired.

12. An onion routing network comprising a plurality of circuits of nodes for protecting privacy of data packets generated by smart devices, each circuit comprising an originator node, a guard node, at least one middle node, and an exit node, comprising:

a first node designated as an originator node for:

receiving the data packets from a smart device, comparing a packet destination which comprises a domain name or a destination IP address against a locally stored allowlist of cloud-based destinations associated with smart devices, and if when the domain name is in the allowlist, encapsulating the data packet with a plurality of layers of encryption and forwarding the data packets packet to the onion routing network; or when the packet destination is not included in the allowlist, sending the data packet to the cloud-based destination; or receiving the data packets from the onion routing network and sending them to the smart device;

a second node designated as a guard node for:

receiving the data packets from the originator node and forwarding them to at least one middle node; or receiving the data packets from the at least one middle node and forwarding them to the originator node;

a third node designated as a middle node for:

receiving the data packets from the guard node and forwarding them to the exit node; or receiving the data packets from the exit node and forwarding them to the guard node; and a fourth node designated as an exit node for:

receiving the data packets from the middle node and sending the data packets to a cloud-based destination; or receiving packets from the cloud-based destination and sending them to the middle node;

wherein the exit node verifies that a destination IP address of a non-DNS packet matches an IP address previously returned by that exit node in response to resolving an allowlist domain name, and refuses to forward the packet if the destination IP address does not match.

13. The network of claim 12, the first node comprising:

a first processor and a first non-transitory memory storing instructions that are executed by the first processor to:

compare the domain name in DNS packets with the allowlist of domain names;

when the domain name is not in the allowlist, route the data packet to the cloud-based destination;

compare IP address destinations of non-DNS packets with local set of cached IP addresses;

when the IP address is in the local set of cached IP addresses, encapsulate the data packet with a plurality of layers of encryption and route the encapsulated data packet to the guard node; and when the IP address is not in the local set of cached IP addresses, route the data packet to the cloud-based destination.

14. The network of claim 12, the second node comprising:

a second processor and a second non-transitory memory storing instructions that are executed by the second processor to:

receive an encapsulated data packet from the first node or the third node;

remove a layer of encryption from the encapsulated data packet; and forward the encapsulated data packet to the third node or the first node, respectively.

15. The network of claim 12, the third node comprising:

a third processor and a third non-transitory memory storing instructions that are executed by the third processor to:

receive an encapsulated data packet from the second node or the fourth node;

remove a layer of encryption from the encapsulated data packet; and forward the encapsulated data packet to the second node or the fourth node, respectively.

16. The network of claim 12, the fourth node comprising:

a fourth processor and a fourth non-transitory memory storing instructions that are executed by the fourth processor to:

receive an encapsulated data packet from the third node;

decrypt the encapsulated data packet;

when the encapsulated data packet is a DNS request containing a domain name:

compare the domain name in the DNS request with an allowlist;

when the domain name is in the allowlist, route the data packet to the cloud-based destination; or when the encapsulated data packet does not contain a DNS request:

compare an IP address destination of the encapsulated data packet with a local set of cached IP addresses; and when the IP address is in the local set of cached IP addresses, route the data packet to the cloud-based destination.

17. The network of claim 16, the fourth non-transitory memory storing further instructions that are executed by the fourth processor to:

receive a data packet from the cloud-based destination;

encapsulate the data packet with a plurality of layers of encryption; and forward the encapsulated data packet to the third node.

18. The network of claim 16, wherein the encapsulated data packet from a smart device includes a DNS request and the cloud-based destination is a DNS server, the fourth non-transitory memory storing instructions that are executed by the fourth processor to:

receive a set of IP addresses associated with the domain name from the DNS server;

save the set of IP addresses in the fourth non-transitory memory; and forward the set of IP addresses to the first node.

\* \* \* \* \*